United States Patent [19]
Kulik

[11] Patent Number: 5,233,168
[45] Date of Patent: Aug. 3, 1993

[54] METHOD OF DESKEWING AN IMAGE

[75] Inventor: George Kulik, Trumbull, Conn.

[73] Assignee: Pitney Bowes Inc., Stamford, Conn.

[21] Appl. No.: 767,958

[22] Filed: Sep. 30, 1991

[51] Int. Cl.$^5$ .............................................. G06K 9/32
[52] U.S. Cl. .................................. 235/456; 235/375; 235/454; 235/470; 382/45; 382/46
[58] Field of Search ............... 235/375, 454, 470, 456; 382/45, 46

[56] References Cited

U.S. PATENT DOCUMENTS

| | | | |
|---|---|---|---|
| 4,637,057 | 1/1987 | Kermisch | 382/46 |
| 4,837,845 | 7/1989 | Pruett et al. | 382/46 |
| 4,975,977 | 12/1990 | Kurosu et al. | 382/46 |
| 5,031,225 | 7/1991 | Tachikawa et al. | 382/46 |
| 5,068,904 | 11/1991 | Yamazaki | 382/46 |

*Primary Examiner*—William L. Sikes
*Assistant Examiner*—Scott A. Ouellette
*Attorney, Agent, or Firm*—Robert H. Whisker; Melvin J. Scolnick

[57] ABSTRACT

A method of derotating an image includes the following steps: Scanning a scannable image to capture in memory a pixel by pixel mapped image; determining size and skew of the mapped image; performing a series of area-limited vertical pixel shifts upon the mapped image; and performing a series of area-limited horizontal pixel shifts upon the mapped image. Data contained in informational cells of the scannable image can be extracted by locating clock bits, and using the clock bits to establish a nominal horizontal and vertical position of each cell in the mapped image.

17 Claims, 11 Drawing Sheets

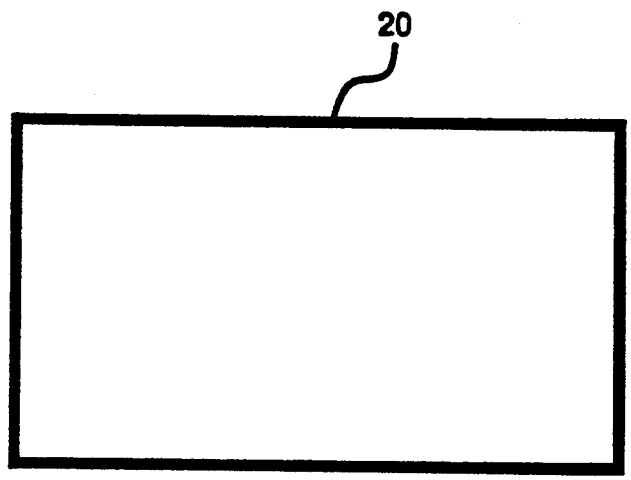
FIG. 1-A
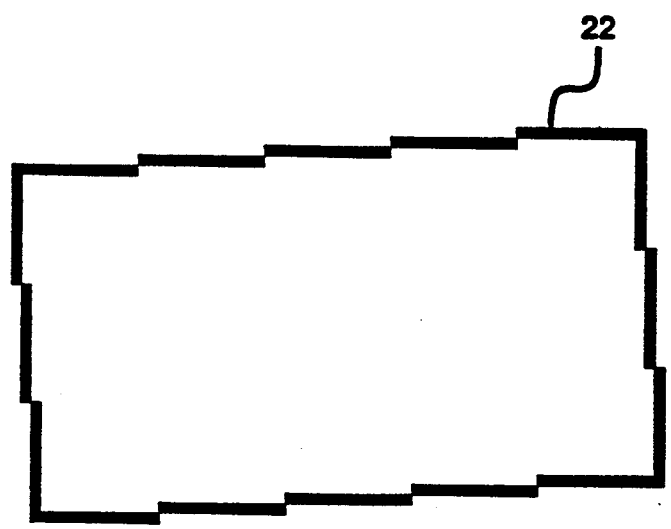
FIG. 1-B

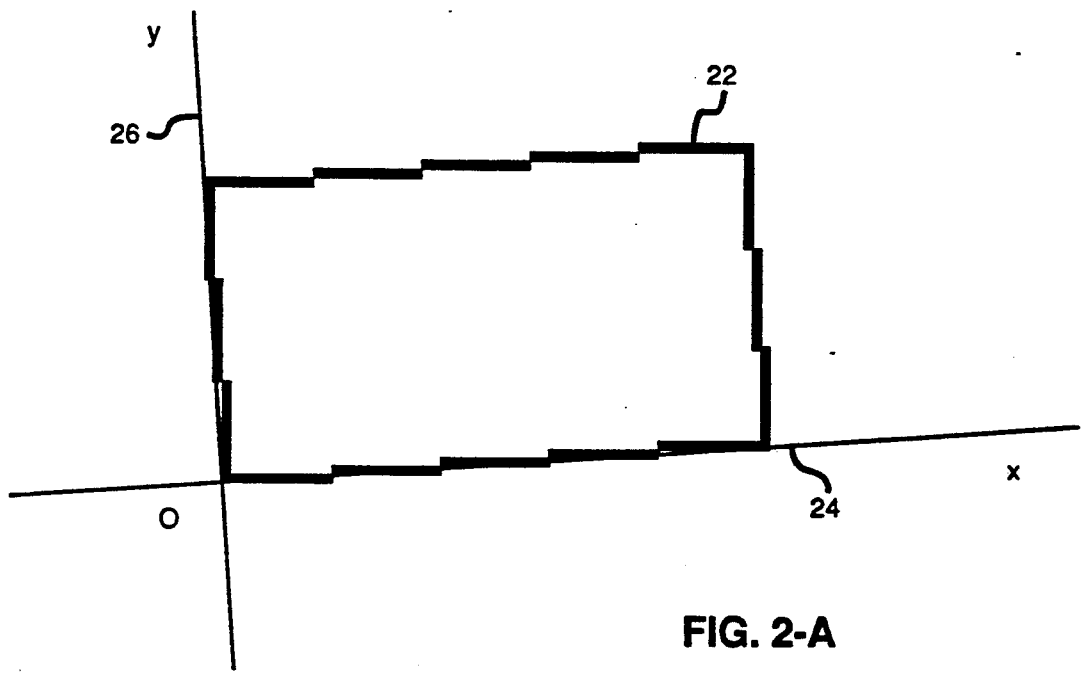
FIG. 2-A
(PRIOR ART)
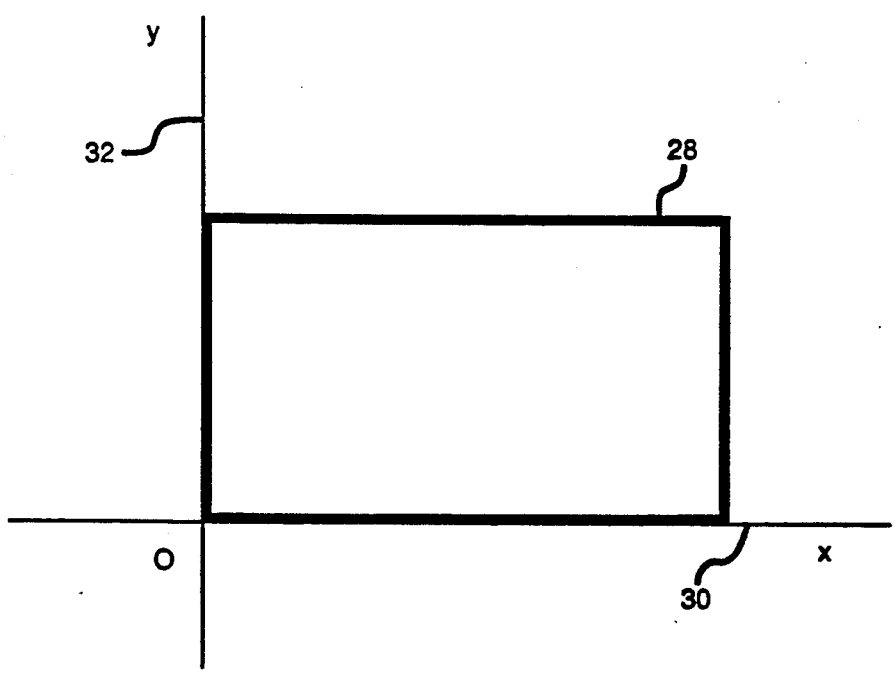
FIG. 2-B
(PRIOR ART)

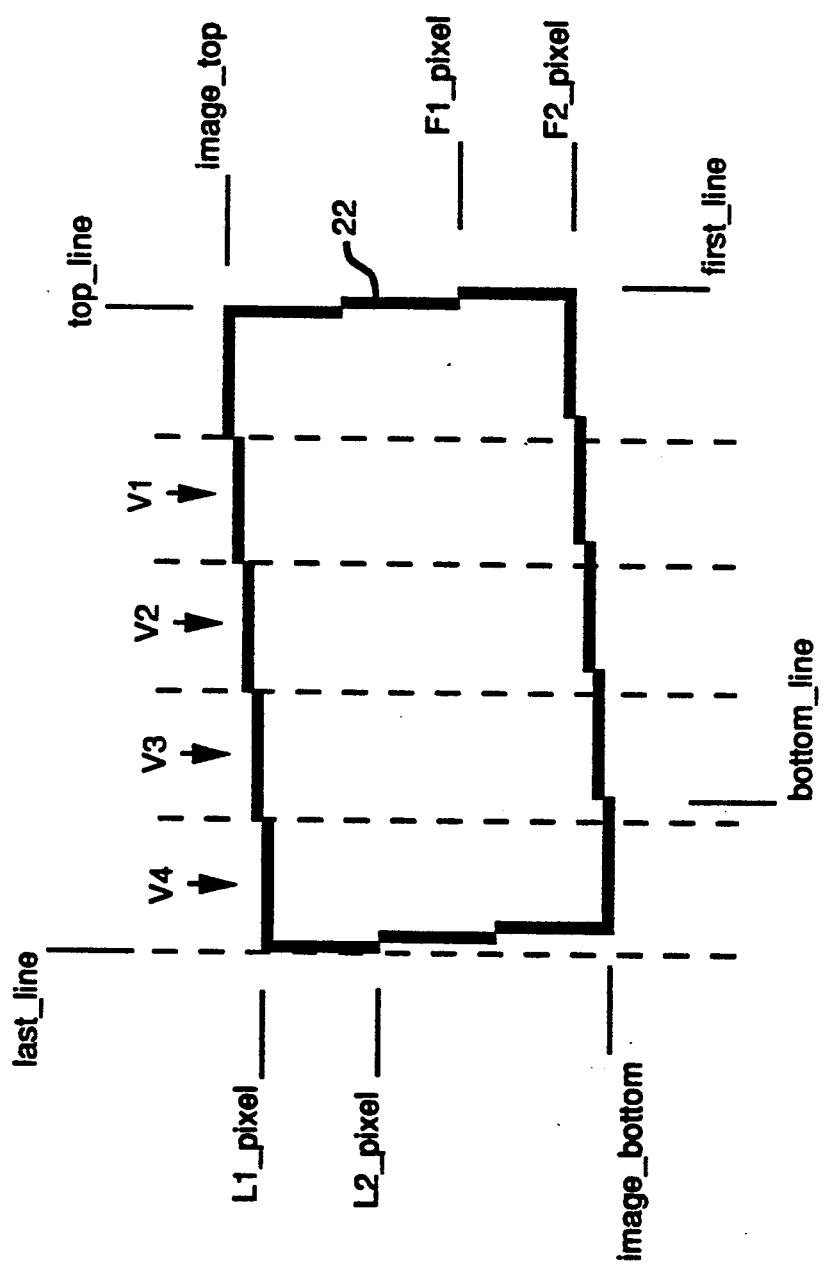
FIG. 3-A

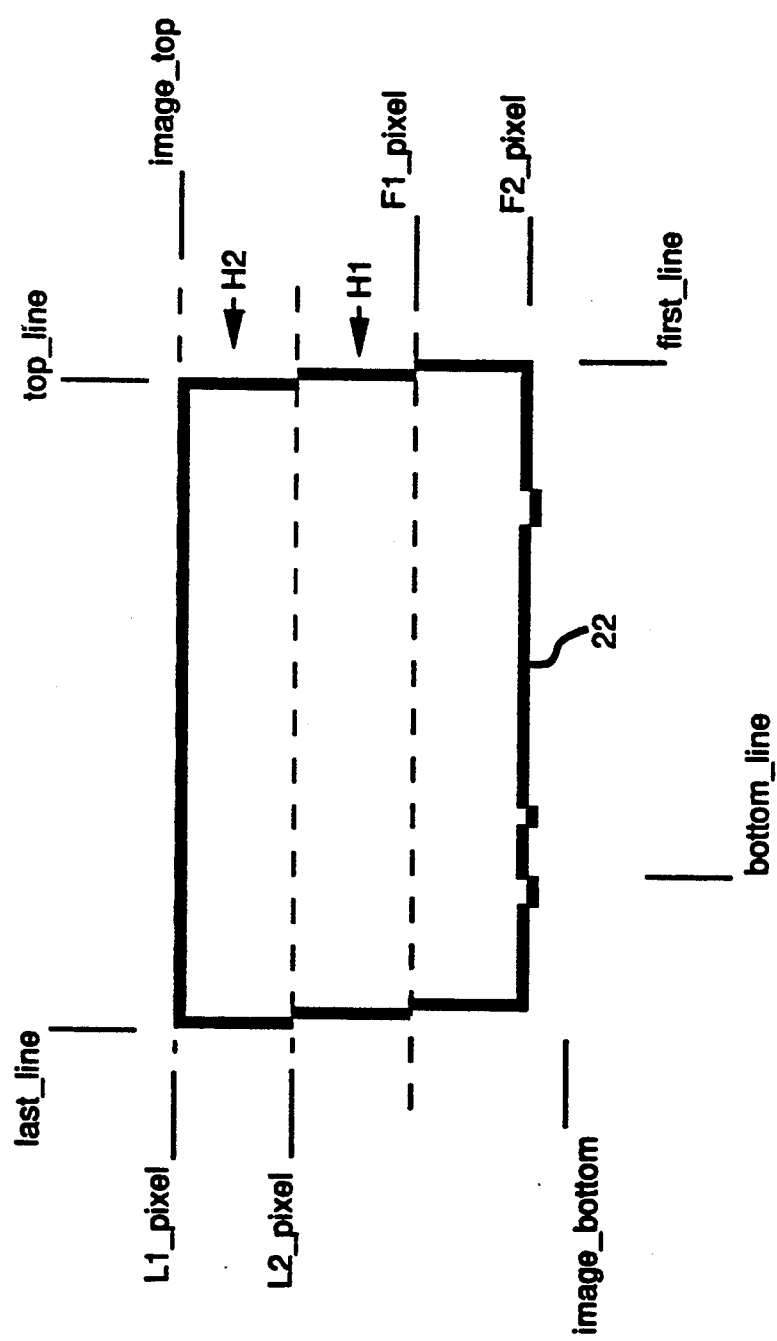
FIG. 3-B

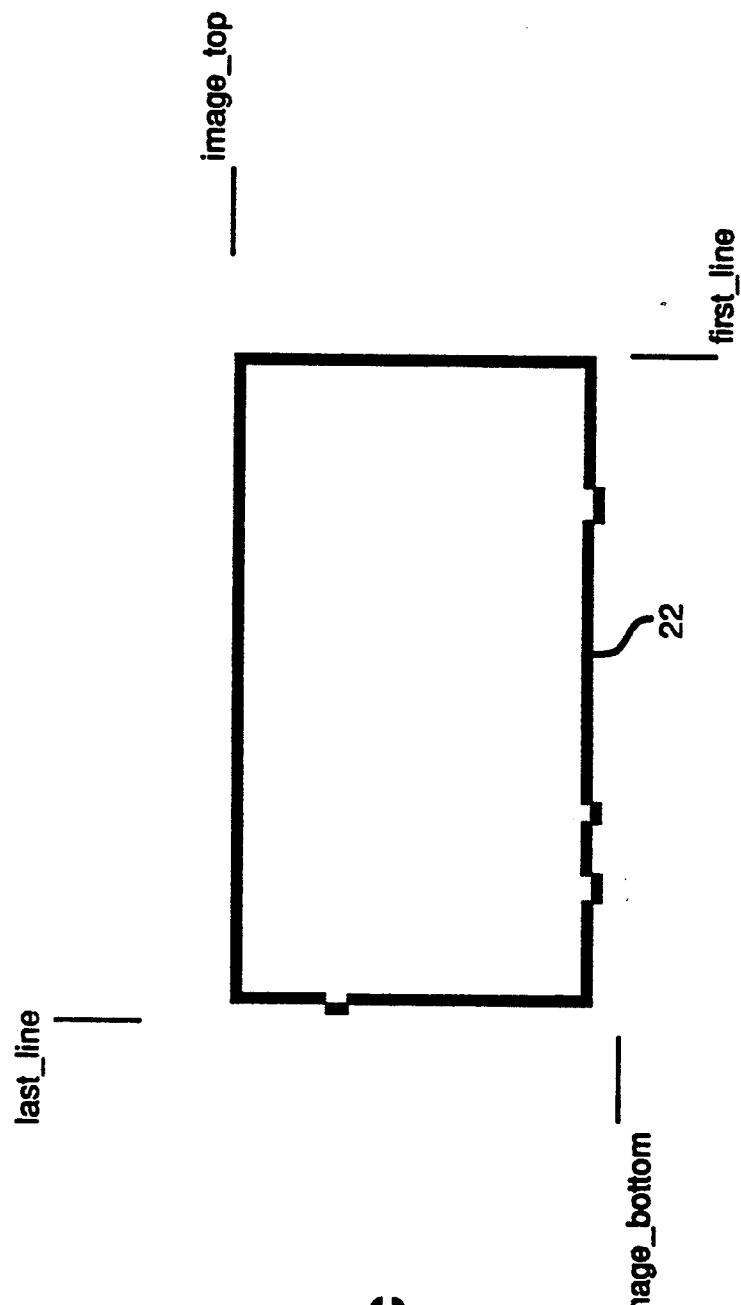
FIG. 3-C

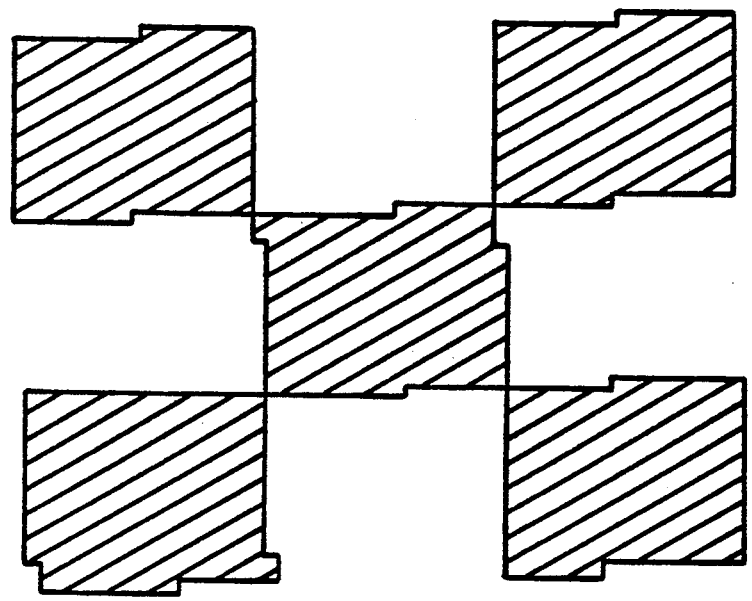
FIG. 7-A
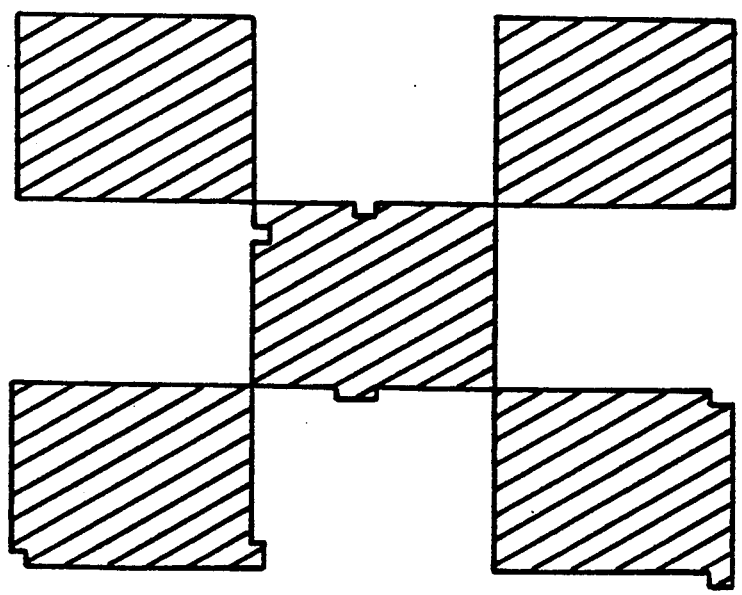
FIG. 7-B

METHOD OF DESKEWING AN IMAGE

FIELD OF THE INVENTION

This invention relates to image processing and more particularly to a method for correcting skew or rotation in a scanned image.

BACKGROUND OF THE INVENTION

It is well known to scan an image and to store a representation of the scanned image in a computer's memory. For example, U.S. Pat. No. 4,939,354, issued to Priddy et al., discloses a binary coded matrix that is optically scanned and stored in memory. The data stored in the matrix is then decoded.

One difficulty that is commonly faced in optically scanned images is skew or rotation of the image as actually captured by the scanning equipment. FIGS. 1-A and 1-B illustrate the problem in schematic terms. In FIG. 1-A, rectangular border 20 represents an image as printed on paper. However, in practice the paper bends, and also may be positioned relative to the scanning equipment, so that the scanned image is skewed or rotated. The skewed, distorted border 22 of FIG. 1-B represents a rotated image. When the image contains binary coded data cells, rotation may cause serious difficulties in determining the locations of the data cells and extracting the data therefrom.

It is known to 'derotate' a scanned image by remapping the scanned image pixel by pixel. As schematically illustrated in FIGS. 2-A and 2-B, for each pixel in rotated image 22, coordinates are calculated in accordance with rotated axes 24, 26. Each pixel is then remapped so that a derotated image 28 is formed, aligned with properly oriented axes 30, 32.

The pixel by pixel remapping method just described requires a large number of calculations and so is very time consuming and expensive. A simpler and less expensive derotation method is desirable.

SUMMARY OF THE INVENTION

According to the subject invention, a method of derotating an image includes the steps of:

(a) scanning a scannable image to capture in memory a pixel by pixel mapped image;

(b) determining size and skew of the mapped image;

(c) performing a series of area-limited vertical pixel shifts upon the mapped image; and (d) performing a series of area-limited horizontal pixel shifts upon the mapped image.

According to another aspect of the invention, the scannable image includes a matrix of rectangular information cells and a plurality of clock bits around the at least part of the periphery of the matrix, and the clock bits are used for locating the information cells. In addition to the steps just noted, the method in this other aspect also includes the steps of:

(e) locating at least some of the clock bits, after performing the vertical and horizontal shifts;

(f) locating the information cells, after locating the clock bits; and (g) extracting data from the located information cells.

BRIEF DESCRIPTION OF THE DRAWINGS

FIGS. 1-A, 1-B are schematic representations of, respectively, a printed image and a rotated and distorted mapping of the printed image as captured by optical scanning equipment.

FIGS. 2-A, 2-B are a schematic illustration of a prior art method of derotating an image.

FIGS. 3-A, 3-B, 3-C are a schematic illustration in general terms of the method of the subject invention.

FIGS. 7-A and 7-B are a schematic illustration of the effects of derotation upon some information cells of the image of FIG. 6.

DETAILED DESCRIPTION OF THE INVENTION

Figure 4:
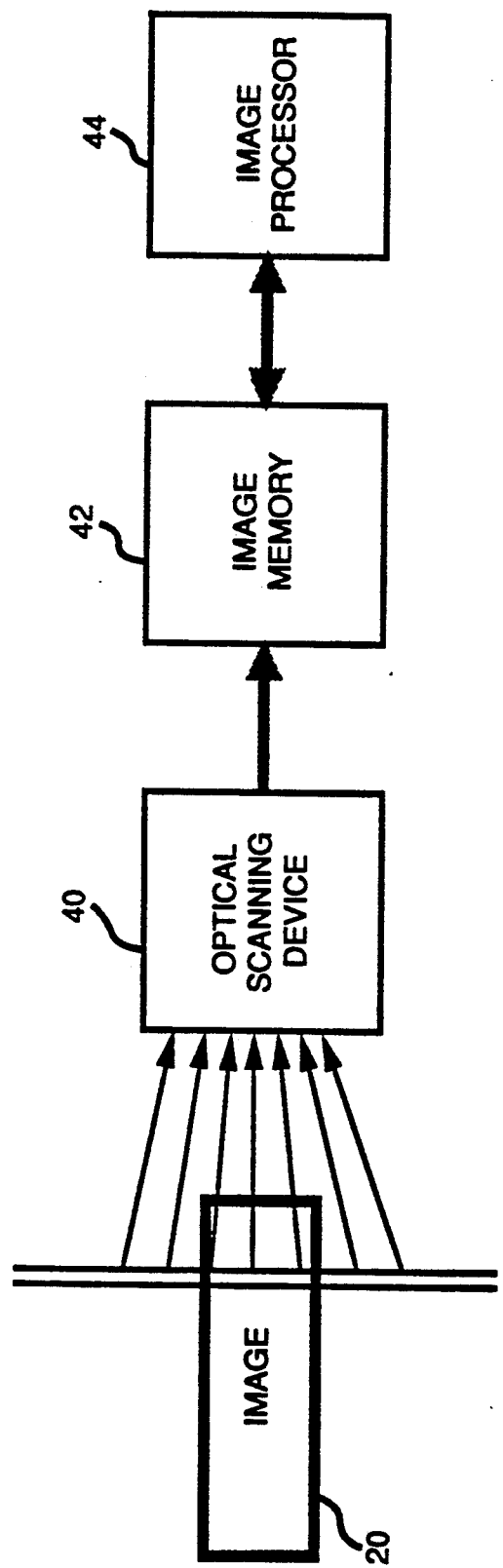
FIG. 4 is a block diagram of equipment used to perform the method of the subject invention.

Referring now to FIGS. 3-A, 3-B, 3-C, 4 and 5, the method of the subject invention will be described in detail.

In FIG. 3-A, reference numeral 22 indicates, as before, a distorted, rotated, pixel-by-pixel mapped image as stored in a computer memory. As is well known to those skilled in the art, each bit of storage in memory is considered to represent one pixel in a two dimensional array, with the binary value stored in a particular bit location representing the state (on/off or white/black) of its corresponding pixel.

FIG. 4 shows in schematic form equipment capable of capturing and storing such a mapped image. Printed image 20 is scanned line-by-line by optical scanner 40. The output of scanner 40 is stored as a pixel-by-pixel mapped image in image memory 42. The mapped image, stored as binary data in memory 42, is subject to reading and processing by image processor 44.

Scanner 40 may take the form of a conventional line scanning video camera such as the Soricon Datasweep 1-PB video camera obtained from Soricon Corporation, Boulder, Colo. Alternatively, scanner 40 may be a CCD line scanning device or any other scanner that produces a pixel-by-pixel scanned image. As another alternative, any device that produces a pixel-by-pixel image may be used.

Memory 42 and processor 44 may both be realized in a conventional microcomputer, the microcomputer may be, for example, available from Compaq Computer Corp., Houston, Tex. which is interfaced to scanner 40.

Scanner 40 and printed image 20 are moved relative to each other, preferably by transporting the paper on which image 20 is printed past scanner 40. Any convenient transport mechanism may be used. (It will be understood that with some types of image capture devices, that may be used instead of scanner 40, no relative movement will be required.)

Figure 5:
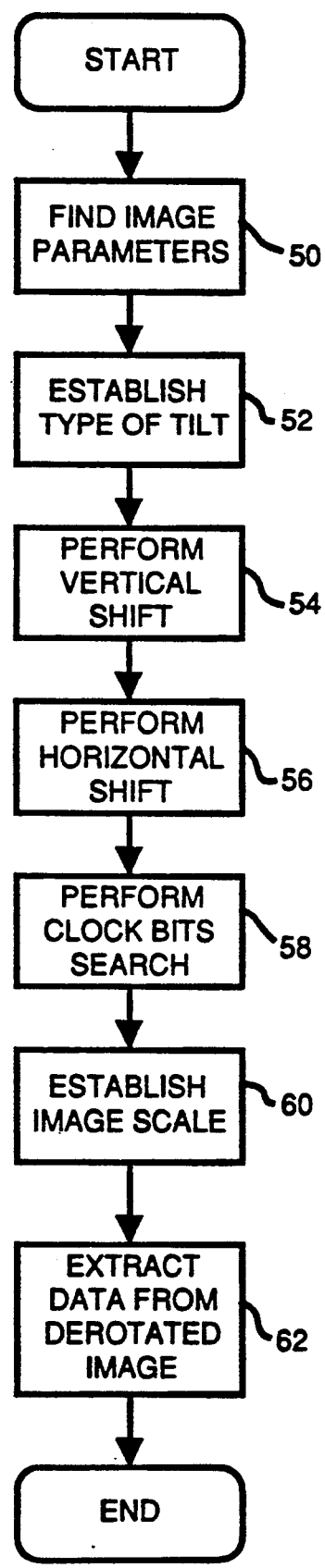
FIG. 5 is a flow chart that illustrates a program for performing the method of the subject invention.

FIG. 5 is a flow chart of a program that controls image processor 44 for the purpose of performing the method of the subject invention. It is assumed that a mapped image 22 has been captured and stored in memory. The program of FIG. 5 then begins with step 50, at which processor 44 determines a number of parameters for image 22, including the following (FIG. 3-A):

"image_top": the location of the highest row of pixels in which a pixel of image 22 is found.

"image_bottom": the location of the lowest row of pixels in which a pixel of image 22 is found.

"first_line": the location of the rightmost column of pixels in which a pixel of image 22 is found.

"last_line": the location of the leftmost column of pixels in which a pixel of image 22 is found.

"top_line": the location of the rightmost column of pixels that includes a pixel of image 22 that is in the "image_top" row.

"bottom_line": the location of the rightmost column of pixels that includes a pixel of image 22 that is in the "image_bottom" row.

"F1_pixel": the location of the highest row of pixels that includes a pixel of image 22 that is in the the "first_line" column.

"F2_pixel": the location of the lowest row of pixels that includes a pixel of image 22 that is in the "first_line" column.

"L1_pixel": the location of the highest row of pixels that includes a pixel of image 22 that is in the "last_line" column.

"L2_pixel": the location of the lowest row of pixels that includes a pixel of image 22 that is in the "last_line" column.

Using these parameters, processor 44 is able to determine the size of image 22 and the limits of the area bounding image 22. By way of example, the height of the image in pixels may be calculated as equal to the larger of: (a) the difference between "image_top" and "F2_pixel", and (b) the difference between "image_top" and "L2_pixel". Processor 44 then proceeds (step 52) to determine whether the left side of image 22 tilts down (as is the case shown in FIG. 3-A) or the right side tilts down. This determination may be made, for example, by determining whether "top_line" is closer to "first_line" or to "last_line".

Processor 44 next performs a series of area-limited vertical pixel shifts (step 54). If, as shown, the left side of image 22 tilts down, the vertical shifts begin at "top_line" and proceed to the left. If the right side tilts down, the vertical shifts again begin at "top_line" but proceed to the right. The areas subject to the successive shifts are vertical strips V1, V2, V3, V4 shown in FIG. 3-A. The width of strips V1, V2, V3, V4 as shown in FIG. 3-A may be considered exaggerated, as the preferred width of each strip is one pixel. The distance of shifting of each strip is equal to the distance between the "image_top" row and the highest pixel of image 22 in that strip. Each pixel in the strip is shifted upwards by that distance, which may be considered the "shift distance". If a strip of more than one pixel in width is used (say n pixels wide, n being an integer greater than 1), the shift distance for the strip may be determined, for example, by taking the mean of the distances between the "image top" row and highest pixel of image 22 in each of the n columns of the strip. It will be appreciated, however, that a one pixel wide strip will produce better results.

In either case, it will be seen that the shift distance represents the distance between the part of the image contained in that strip and the nominal top of the image.

In the example shown, the portions of image 22 to the right of "top_line" are not shifted, as such shifts would increase distortion of image 22.

FIG. 3-B schematically shows the effects of the vertical shifting of step 54. It will be observed that the top of image 22 is now horizontal and aligned with "image_top". The bottom of image 22 is also now largely horizontal, except for a few remaining distortions.

Processor 44 next performs a series of area-limited horizontal shifts (step 56). Because the left side of image 22 at the outset was tilted down, the shifts are made to the right, beginning at "F1_pixel" and proceeding upwards. (If the right side of image 22 had tilted down, the shifts would be made to the left, beginning a L1 pixel—which would be near the bottom of image 22—and proceeding upwards.) The areas subject to the horizontal shifts are horizontal strips H1, H2. Again, as shown in FIG. 3-B, the widths of strips H1, H2 may be considered exaggerated, as the preferred width is one pixel. The shift distance of each horizontal strip is equal to the distance between the "first_line" column and the rightmost pixel of image 22 in that strip. Each pixel in the strip is shifted to the right by that distance. (As noted with respect to the vertical shifts, a wider strip and an averaged shift distance could be used, but are not preferred.)

FIG. 3-C schematically shows the effects of the horizontal shifting of step 5b. It will be observed that the right side of image 22 is now vertical and aligned with "first_line". The left side of image 22 is also now largely vertical except for a small residual distortion.

Although in the procedure as just described, vertical shifting preceded horizontal shifting, it should be recognized that the horizontal shifting could have been performed first. It should also be recognized that the vertical shifting could have been downwards (to cause alignment with "image_bottom") rather than upwards, and that the horizontal shifting could have been to the left rather than to the right.

With the completion of step 56, image 22 has been substantially derotated. It will now be assumed that printed image 20 was of the type which contains binary data in bit-encoded form, and extraction of that data from derotated image 22 will now be described. (Examples of such printed images may be seen in U.S. Pat. No. 4,782,221 to Brass et al. and in U.S. Pat. No. 4,949,381 to Pastor)

Figure 6:
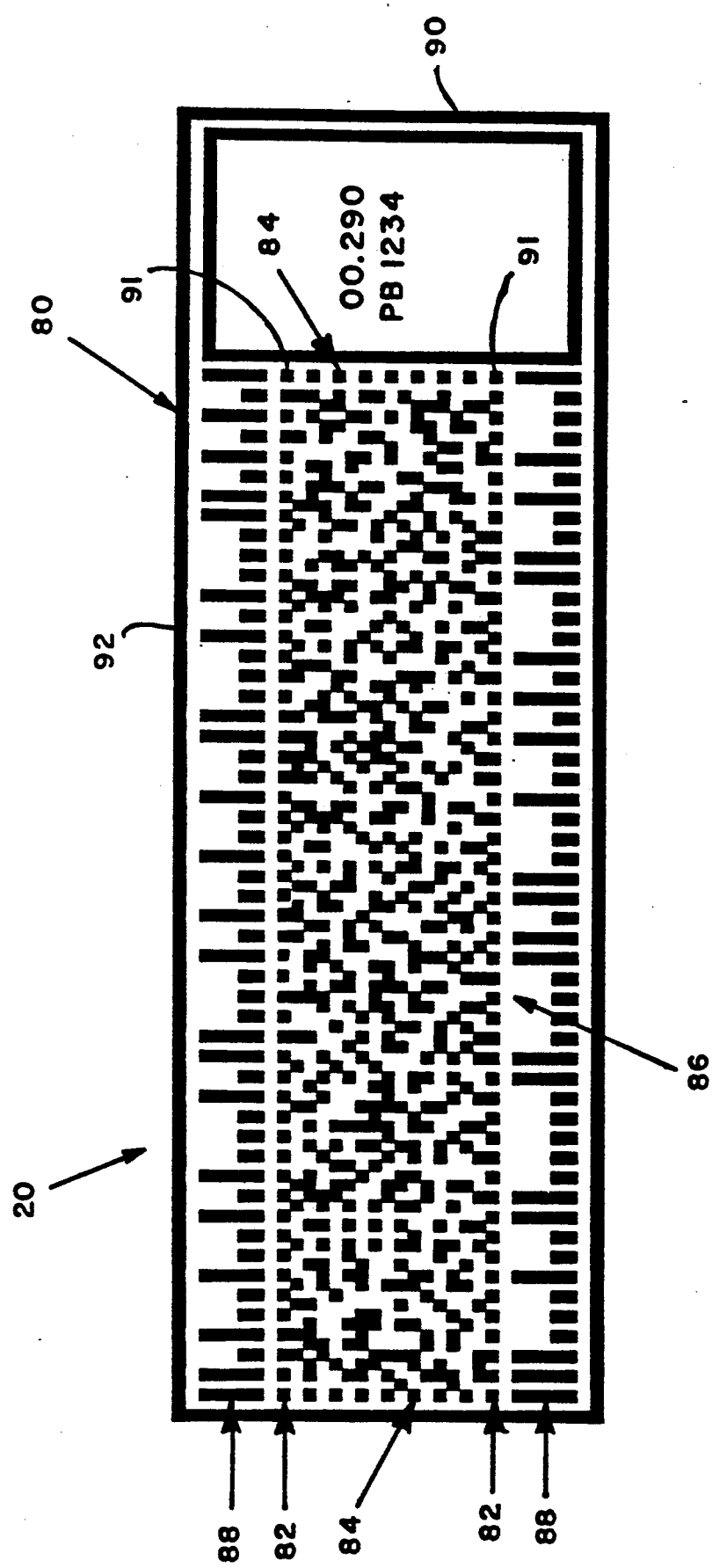
FIG. 6 is a detailed representation of an image to be scanned and processed using the subject invention.

In connection with a discussion of data extraction, a more detailed representation of image 20 will now be introduced by reference to FIG. 6. Printed image 20 of FIG. 6 is generally in the form of a postage indicia with bit-encoded data. As shown image 20 is magnified; in a preferred approach to the invention, the actual dimensions of image 20 are about ⅞" high by 3 ⅛" wide.

Image 20 is defined by a rectangular border 80 and includes two horizontal rows 82 of equally spaced square clock bits and two vertical columns 84 of equally spaced square clock bits. Inside the areas bounded by rows 82 and columns 84 is a matrix 86 of square information cells. Each cell is printed either all in black or all in white and represents one binary bit of data. Each information cell is the same size as the clock bits. In the preferred matrix 86 as shown on FIG. 6, there are roughly 1500 information cells, so that about 1500 binary bits of data may be represented by image 20. Image 20 also includes bar codes 88, which are of the type known as the Postnet bar code, as described in the Domestic Mail Manual, which is published by the U.S. Postal Service.

FIGS. 7-A and 7-B show in schematic terms the effects of the subject method of derotation on particular information cells of matrix 86. FIG. 7-A is a greatly magnified view of a small part of matrix 86 as captured in memory 42. The part of matrix 86 shown in FIG. 7-A represents a three-by-three array of information cells. It will be noted that the cells shown in FIG. 7-A are rotated and distorted.

FIG. 7-B shows the cells of FIG. 7-A after the vertical and horizontal shifting of steps 54 and 56. The cells are now substantially derotated and mainly free of distortion.

Returning now to the flow chart of FIG. 5, after step 56, processor 44 performs a search (step 58) for horizontal rows 82 of clock bits. The search algorithm is similar to known step and search algorithms and assumes that the image scanned is of a predetermined type, having standard dimensions and with rows 82 in predetermined locations. Using the known dimensions of the derotated image, an estimate is made of the position of the rightmost clock bit 91 of each of rows 82 (FIG. 6). The estimate in each case is made in terms of a horizontal distance left from right hand boundary 90 and a vertical distance down from top boundary 92. The estimate is slightly biased to the right, so that the search begins to the right of clock bit 91. Clock bit 91 is considered to be found when a predetermined number of "black" pixels have been found. The predetermined number is a function of the over-sampling rate, which is discussed below.

After clock bit 91 is located, the horizontal location of the center of each succeeding clock bit of row 82 is found. The horizontal location is considered to be a predetermined number of pixels to the left of the white to black transition that occurs at the border of the clock bit. Again, the predetermined number is a function of the over-sampling rate.

Figure 8:
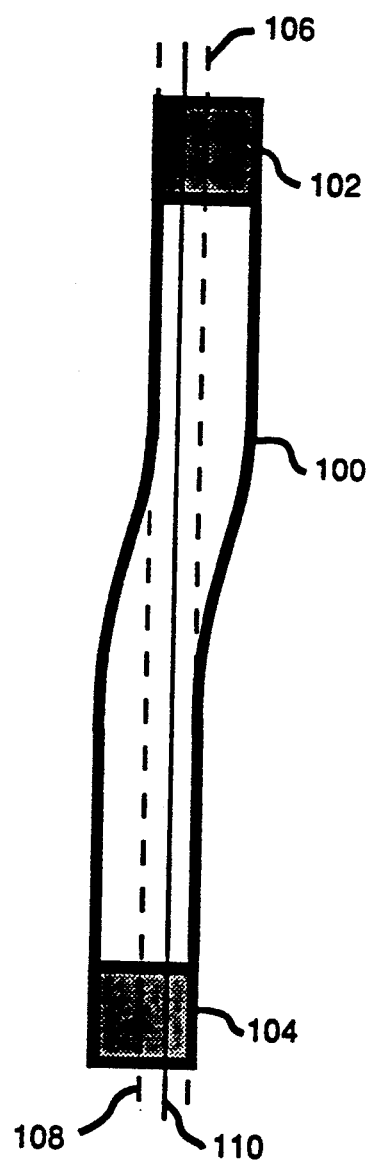
FIG. 8 is a schematic representation of a column of information cells with residual skewing.

Once the horizontal locations have been found for the centers of the clock bits, the program proceeds to establish a nominal horizontal location for the centers of the information cells of matrix 86. This process is schematically illustrated by FIG. 8, which shows a column 100 of information cells with associated top clock bit 102 and bottom clock bit 104. (For the purposes of this representation, the black or white state of the information cells has been disregarded). It will be noted that column 100 exhibits some residual horizontal skewing.

Dashed lines 106 and 108 respectively represent the horizontal locations of the centers of bits 102 and 104. Solid line 110, located between, and preferably midway between, lines 106 and 108, represents the nominal horizontal location to be established for the information cells of column 100. It will be recognized that if lines 106 and 108 coincide, line 110 will also coincide with lines 106 and 108. Similarly, if lines 106 and 108 are sufficiently close, line 110 may be allowed to coincide with line 106 or line 108. This would be the case, for example, if line 108 were displaced only one pixel to the left or right of line 106.

In this way, a nominal horizontal location is established for the center each column of information cells in matrix 86. It then remains to determine the vertical location of the center of each information cell. One way in which this can be done is by finding the vertical locations of the clock bits of columns 84, and then applying the same procedure to rows of information cells as was illustrated for column 100 of FIG. 8. However, given the relatively small vertical dimension and large horizontal dimension of matrix 86, it has been found sufficient simply to divide image 20 (after capture and derotation) into a number of vertical strips, calculate the height of each strip, and estimate the vertical location of each row of information cells within the strip. The estimate is based upon the known height of printed image 20 as measured in terms of the width of the information cells and also upon the known vertical displacement of the cells from the top of image 20, again as measured in information cells. Thus, within each strip the estimate of the vertical location of each row is used as the nominal vertical location of the information cells of that row that are contained within that strip.

For the image 20 of FIG. 6, the height of the image is 33 times the width of the information cells. Given image 20's actual dimensions of ⅞" high by 3 ⅝" wide, twenty vertical strips were found to be an adequate number for estimating the vertical locations of information cell centers.

It will be seen that nominal vertical and horizontal locations have been established for the center of each information cell of matrix 86. This process is represented by step 60 of the flow chart of FIG. 5 and may be referred to as establishing the scale of the captured, derotated image.

Step 62, extraction of data from the derotated image, follows step 60. For each information cell, the pixel that is uniquely identified by the established nominal vertical and horizontal locations is considered to be the center pixel of the information cell. In a preferred approach to the subject invention, the state (black or white) of each information cell is deemed to be the same as the state of its center pixel. The data bit (1 or 0) represented by each information cell can therefore be determined from the known states of the center pixels, and the data contained in matrix 86 can thereby be extracted, stored, decoded, processed, etc.

As an alternative to simply equating the information cell's state to that of its center pixel, one may consider the three-by-three array of pixels that is centered on the center pixel, and take the average of the states of the nine pixels as indicative of the information cell's state. Similarly, one can exclude from consideration the corner pixels from the three-by-three array and take the average of the states of the remaining five as indicative of the information cell's state. However, equation of the cell's state to that of its center pixel was found to produce more accurate results than the other approaches, and also saves computation and other processing.

Figure 9:
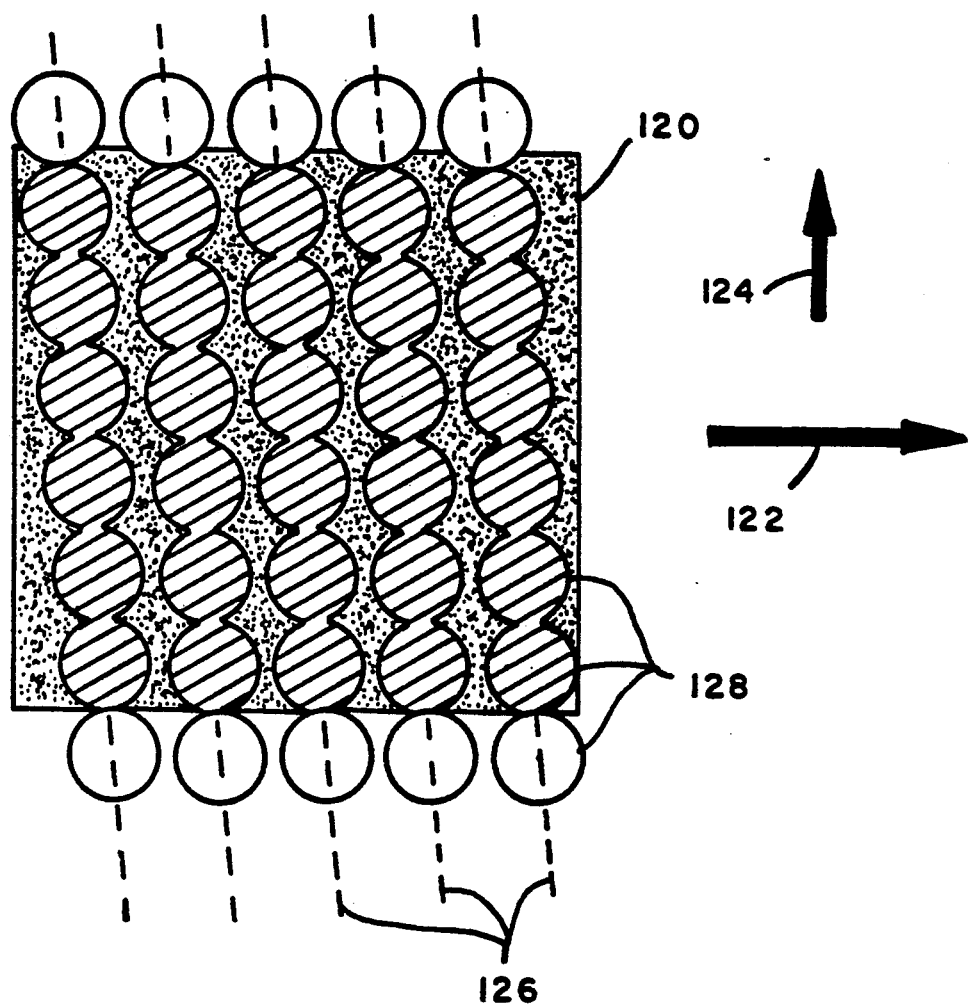
FIG. 9 is a schematic illustration of "over-sampling" of an information cell of FIG. 6.

For the sake of clarity, the term "over-sampling" will now be explained with reference to FIG. 9. Information cell 120 is shown as an enlargement of one of the cells making up matrix 86 (FIG. 6). Cell 120 is shown as having the state "black" and the cells surrounding cell 120 are not shown, except that the cells above and below cell 120 are assumed for the purposes of illustration to have the state "white".

Arrow 122 indicates the direction in which image 20 (of which cell 120 is a part) is moved relative to scanning device 40. This direction will be referred to as the "transport direction". Arrow 124 is normal to arrow 122 and indicates the instantaneous direction of line-scanning by device 40. This direction will be referred to as the "scan direction".

Dashed lines 126 indicate the orientation of scanning lines with respect to cell 120 and reflect the movement of image 20 (and cell 120) in the transport direction during the course of each line scan. Arranged along each line 126 are pixels 128. It will be observed that each pixel 128 that falls largely within cell 120 is shown as black, while each pixel outside of cell 120 is shown as white, reflecting the assumed "white" state of the cells above and below cell 120. It should also be understood that only a small portion is shown of the scanning lines represented by lines 126, and that those scanning lines continue throughout the entire height of image 20 and beyond, with pixels arranged along the entire length of each scanning line. It should further be understood that only the scanning lines that cross cell 120 are shown, and that there are other scanning lines at similar, regular intervals along the entire width of image 20.

It should now be noted that along each scanning line approximately six pixels fall within cell 120. It can therefore be said that the over-sampling rate in the scan direction is about six times. Similarly, about five scan lines pass through cell 120 so that the over-sampling rate in the transport direction is about five times.

It will be recognized that the over-sampling rate in the transport direction is a function of the width of cell 120, the speed at which image 20 is moved relative to scanning device 40, and the number of scans per second. The oversampling rate in the scan direction is a function of the height of cell 120 and the spacing of pixels 128 along the scanning line 126.

Using a 300 d.p.i. printer, the information cells 120 of matrix 86 were defined as a seven-by-seven dot array, yielding a cell than was 7/300 in. square. With the equipment described above in connection with FIG. 4 oversampling rates of about five times in one direction and about six times in the other direction were achieved. While a satisfactory level of accuracy was obtained with these oversampling rates, it may be anticipated that superior results would occur with oversampling rates in the range of from seven to ten times in each direction.

Although the approach described above was implemented with a conventional microcomputer operating under the control of a stored program, it will be recognized that the method of the subject invention may be readily and advantageously implemented using an application specific integrated circuit (ASIC) or a conventional programmable digital signal processing (DSP) microcircuit. As presented in the foregoing discussion, the information cells 120 are printed only in two states, either black or white. It is, however, within the contemplation of this invention to print information cells 120 in a palette of colors or in a gray scale so that each cell 120 could represent much more than a binary bit of information. For example, a gray scale of 256 shades could be used, allowing each cell 120 to represent a single digit of a number system of radix 256. It is apparent that a number of other variations and modifications may be made to the invention and it is therefore intended in the following claims to cover each such modification and variation as falls within the true spirit and scope of the invention.

What is claimed is:

1. A method of derotating an image by an angle less than 90 degrees comprising the steps of:
    (a) scanning a scannable image to capture in memory a pixel by pixel mapped image;
    (b) determining size and skew of said mapped image;
    (c) performing a series of area-limited vertical pixel shifts upon said mapped image to horizontally align predetermined vertical strips comprising said mapped image; and
    (d) performing a series of area-limited horizontal pixel shifts upon said mapped image to vertically align predetermined horizontal strips comprising said mapped image.

2. The method of claim 1, wherein said series of vertical shifts is performed before said series of horizontal shifts.

3. The method of claim 1, wherein said series of horizontal shifts is performed before said series of vertical shifts.

4. The method of claim 1, wherein each of said vertical shifts is performed on a one-pixel-wide area of said mapped image and each of said horizontal shifts is performed on a one-pixel-high area of said mapped image.

5. The method of claim 1, wherein said step (c) comprises the substeps of (i) dividing said mapped image into a plurality of vertical strips, said vertical strips having a width in pixels; (ii) calculating a shift distance for each said vertical strip; and (iii) shifting every pixel in said vertical strip by the calculated shift distance for said strip;
    said step (d) comprising the substeps of (x) dividing said mapped image into a plurality of horizontal strips, said horizontal strips having a width in pixels; (y) calculating a shift distance for each said horizontal strip; and (z) shifting every pixel in said horizontal strip by the calculated shift distance for said strip.

6. The method of claim 5, wherein said width of each said vertical strip is one pixel and said width of each said horizontal strip is one pixel.

7. A method of extracting data from a scannable image, said scannable image comprising a matrix of rectangular information cells and a plurality of clock bits around at least part of the periphery of said matrix, said clock bits indicating locations of said information cells, the method comprising the steps of:
    (a) scanning said scannable image to capture in memory a pixel by pixel mapped image;
    (b) determining size and skew of said mapped image;
    (c) performing a series of area-limited vertical pixel shifts upon said mapped image;
    (d) performing a series of area-limited horizontal pixel shifts upon said mapped image;
    (e) after performing said vertical and horizontal shifts, locating at least some of said clock bits;
    (f) after locating said at least some clock bits, locating said information cells; and
    (g) extracting data from said located information cells.

8. The method of claim 7, wherein said step of locating said information cells comprises establishing a nominal horizontal location and a nominal vertical location for the center of each of said cells.

9. The method of claim 8 wherein said located at least some clock bits are used in establishing at least one of said nominal horizontal location and said nominal vertical location for at least some of said located information cells.

10. The method of claim 8, wherein said step of extracting data from said located information cells comprises determining a state, for each information cell, of a pixel having said established horizontal and vertical location of said cell's center and equating said cell's state to said pixel's center.

11. The method of claim 7, wherein said step (c) comprises the substeps of (i) dividing said mapped image into a plurality of vertical strips, said vertical strips having a width in pixels; (ii) calculating a shift distance for each said vertical strip; and (iii) shifting every pixel in said vertical strip by the calculated shift distance for said strip;

said step (d) comprising the substeps of (x) dividing said mapped image into a plurality of horizontal strips, said horizontal strips having a width in pixels; (y) calculating a shift distance for each said horizontal strip; and (z) shifting every pixel in said horizontal strip by the calculated shift distance for said strip.

12. The method of claim 11, wherein said width of each said vertical strip is one pixel and said width of each said horizontal strip is one pixel.

13. A method of extracting data from a scannable image, said scannable image comprising a matrix of rectangular information cells, each of said cells representing a data bit, said matrix consisting of rows and columns of said information cells, each said column having associated therewith at least two clock bits, the method comprising the steps of:

(a) scanning said scannable image to capture in memory a pixel by pixel mapped image;

(b) determining size and skew of said mapped image;

(c) performing a series of area-limited vertical pixel shifts upon said mapped image;

(d) performing a series of area-limited horizontal shifts upon said mapped image;

(e) after performing said vertical and horizontal shifts, establishing a nominal horizontal position of the center of said clock bits;

(f) establishing a nominal horizontal position of the center of each said column on the basis of said nominal horizontal positions of said clock bits associated with said column;

(g) establishing a nominal vertical position of the center of each of said information cells; and (h) for each information cell, determining a state of a pixel having said nominal vertical position of said cell's center and said nominal horizontal position of the center of a column that includes said cell and equating said cell's state to the determined state of said pixel; whereby said data bits are extracted from said scannable image.

14. The method of claim 13, wherein said step of establishing said nominal vertical position comprises:

dividing said mapped image into a plurality of vertical strips;

measuring the height, in pixels, of each said strip; and in each said strip, establishing an estimated vertical position of the center of each information cell contained therein on the basis of:

(x) said measured height of said strip;

(y) a predetermined height of said scannable image; and (z) said cell's predetermined vertical position in said scannable image.

15. The method of claim 14, wherein said series of vertical shifts is performed before said series of horizontal shifts.

16. The method of claim 13, wherein said step (c) comprises the substeps of (i) dividing said mapped image into a plurality of vertical strips, said vertical strips having a width in pixels; (ii) calculating a shift distance for each said vertical strip; and (iii) shifting every pixel in said vertical strip by the calculated shift distance for said strip;

said step (d) comprising the substeps of (x) dividing said mapped image into a plurality of horizontal strips, said horizontal strips having a width in pixels; (y) calculating a shift distance for each said horizontal strip; and (z) shifting every pixel in said horizontal strip by the calculated shift distance for said strip.

17. The method of claim 13, wherein said width of each said vertical strip is one pixel and said width of each said horizontal strip is one pixel.

* * * * *